Patented July 11, 1950

2,514,533

UNITED STATES PATENT OFFICE 2,514,533

DIELS-ALDER CONDENSATION PRODUCTS OF CERTAIN POLYOLEFINIC, CYCLIC HYDROCARBON FRACTIONS

Herman S. Bloch, Chicago, Ill., assignor to Universal Oil Products Company, Chicago, Ill., a corporation of Delaware No Drawing. Application December 24, 1947, Serial No. 793,764

4 Claims. (Cl. 260—468)

This application is a continuation in part of my co-pending application Serial No. 561,324, filed October 31, 1944, now abandoned.

The present invention relates to new surface active agents having washing, wetting and emulsifying activity and to a process for the manufacture of such materials. More particularly, the present process concerns the production of said surface active agents from a particular charging stock of specified origin as hereinafter provided.

An object of my invention is to prepare water-soluble salts of a new class of acidic compounds.

A further object of my invention is to provide a process for the manufacture of new wetting agents and detergents.

Still another object of the present process is to provide an economical source of highly effective surface active agents derived from a class of conjugated polyolefinic hydrocarbons having a cyclic structure in which a portion of the unsaturation is intra-cyclic and a portion thereof is extra-cyclic.

When certain types of hydrocarbons, generally characterized as non-aromatic, unsaturated types, are reacted in the presence of catalysts capable of promoting conjunct polymerization reactions, under carefully controlled conditions of reaction, the spent catalyst phase is found to contain valuable hydrocarbonaceous substances of polyeolefinic, cyclic structure having a high degree of conjugated unsaturation. This material which can be recovered from the catalyst phase, as hereinafter set forth, is referred to in the aggregate as a mixture of conjunct polymers. It is believed that the hydrocarbon conjunct polymers present in the spent catalyst phase and recovered therefrom by special methods of treating the same are combined with the catalyst in the form of loosely bound complex addition compounds which are decomposed during the treatment for the recovery of the hydrocarbon component thereof.

Broadly, this invention relates to surface active salts of acids prepared by reacting an acidic dienophile with said conjunct polymers containing a major proportion of polyolefinic, cyclic hydrocarbons having a high degree of conjugated unsaturation.

In one of its more specific embodiments, the present invention relates to the production of surface active agents comprising the neutral salts of dienophilic acidic adducts prepared by reacting a mono- or polybasic acidic dienophile with the mixture of conjunct polymers obtained upon decomposition of a catalyst-hydrocarbon conjunct polymerization sludge and neutralizing said adduct with a basic neutralizing agent to form a water soluble salt thereof.

In accordance with another embodiment of the present invention, a surface-active agent is prepared by reacting a dibasic acidic dienophile with a fraction boiling from about 275° to about 375° C. of conjunct hydrocarbon polymers recovered by hydrolysis of a hydrogen fluoride sludge, the individual hydrocarbons of which contain from about 16 to about 27 carbon atoms per molecule, thereafter separating the acidic adduct from the reaction mixture and neutralizing the same with sodium hydroxide to form a water soluble salt thereof comprising said detergent.

The mixture of unsaturated cyclic hydrocarbons herein referred to as conjunct polymers utilized as one of the primary reactants in the formation of the present surface active agents is the product of the so-called conjunct polymerization reaction, referring to a series of successive as well as simultaneous reactions occurring in a reaction mixture comprising unsaturated, non-aromatic hydrocarbons and a reagent specified as a conjunct polymerization catalyst. On contacting the hydrocarbon starting material with the catalyst at reaction conditions generally referred to as sludge-forming conditions, the catalyst effects polymerization of the hydrocarbon reactants charged as well as cyclization and hydrogen transfer between the hydrocarbon reaction components. The net result of the combined hydrogen transfer, polymerization and cyclization reactions (which, in effect occur substantially as a simultaneous combination reaction referred to in the aggregate as a conjunct polymerization reaction) is the production of high molecular weight, unsaturated hydrocarbon molecules having generally a polycyclic structure (although the low molecular weight members are usually monocyclic) and containing numerous olefinic bonds, averaging from about 2 to about 3.5 double bonds per molecule and in some components of the mixture, being as high as 4 per molecule, of which from 40 to 70 percent are conjugated. The unsaturated hydrocarbons formed as a result of the conjunct polymerization reaction combine with the catalyst in certain definite ratios to form a sludge-like complex from which the conjunct polymers utilized as one of the primary reactants herein may be recovered. As a result of the hydrogen transfer occurring during the conjunct polymerization reaction, some of the hydrocarbons present in the reaction mixture become saturated to form a distinct phase in the reaction mixture, separating from the sludge phase as an upper hydrocarbon layer which may be readily decanted from the lower sludge layer.

The properties of the conjunct polymers recovered from the sludge as formed in the conjunct polymerization reaction depend to some extent upon the type of hydrocarbons employed in the sludge-forming or conjunct polymerization reaction. Suitable hydrocarbon starting material comprises, in general, unsaturated hydrocarbons containing at least 3 carbon atoms per molecule such as olefins of either branched or straight chain structure. When utilized as a major component of the charging stock, propylene is desirably admixed with high molecular weight hydrocarbons especially olefins containing at least 6 carbon atoms per molecule, and a larger proportion of catalyst to hydrocarbons is charged to the sludge-forming reaction. Paraffinic hydrocarbons, either alone or in admixture with olefins may also form desirable sludges, especially when branched chain paraffins are selected and when slightly higher temperatures are provided for the reaction compared to the temperature utilized for the conversion of an olefinic charge. Conjunct polymers containing an especially high degree of unsaturation may be prepared when the charging stock to the sludge-forming reaction contains polyolefins and/or acetylenic hydrocarbons containing at least 4 carbon atoms per molecule. An especially preferred charging stock from the standpoint of general availability and desirability in yielding a mixture of conjunct polymers especially suitable in the formation of the present surface active agents is an olefin polymer containing propylene and/or butylene dimers and trimers or a $C_6$ to $C_{12}$ fraction of a thermally cracked gasoline product which is low in aromatic hydrocarbon content.

The reactant referred to as a conjunct polymerization catalyst, capable of reacting with the hydrocarbon charging stock hereinabove noted to form a sludge may be selected from the general group known as Friedel-Crafts metal halide catalysts and from a further group selected from certain acid-acting catalysts. The preferred members of these groups are the aluminum halides of the middle halogens, that is, aluminum chloride and aluminum bromide in their anhydrous state, sulfuric acid of a concentration above about 90% $H_2SO_4$, hydrogen fluoride containing at least 90% HF, preferably the substantially anhydrous reagent, and boron trifluoride, especially in admixture with hydrogen fluoride. In general, hydrogen fluoride is preferred in the preparation of the sludge because of subsequent considerations involved in recovering the catalyst for recycling to the sludge-forming stage of the process without destroying a large proportion of the conjugated unsaturation of the conjunct polymers as they exist within the sludge bound to the hydrogen fluoride component.

When utilizing hydrogen fluoride as catalyst in the formation of the conjunct polymers, the reaction may be effected at temperatures of from about —30° to about 150° C. (preferably from about 0° to about 100° C.) and the ambient pressure is maintained sufficiently superatmospheric to provide substantially complete liquid phase of the reactants. In utilizing aluminum chloride, temperatures of from about 10° to about 125° C. are preferred and with sulfuric acid, the temperature of reaction is preferably maintained slightly lower than for aluminum chloride, (from about 0° to about 100° C.) because of the oxidizing effect of sulfuric acid at higher temperatures. The reactants, generally in weight proportions of from about four parts of hydrocarbon stock to one part of catalyst up to corresponding values of about one to three may be employed. Intimate admixture of the reactants is desirable, so that stirring is generally employed to effect contact between the catalyst and hydrocarbons. The reaction is substantially complete after about one-half hour.

The sludge formed in the conjunct polymerization reaction as a lower layer reaction product thereof may be treated in accordance with several alternative procedures to recover therefrom the conjunct hydrocarbon polymers utilized as starting material in the present process to form the surface active products. One method especially utilized in the case of aluminum chloride and sulfuric acid sludges, but also applicable to a hydrogen fluoride sludge, is by means of aqueous hydrolysis wherein the sludge is merely stirred into or admixed with water or aqueous caustic until the liberation of the conjunct polymers from the sludge is complete. The latter separate as an upper hydrocarbon layer and may be decanted from the lower aqueous layer. Thermal decomposition of the sludge may also be employed, and this is especially adapted to hydrogen fluoride sludges, where the catalyst component is readily vaporizable at relatively low temperatures, and may be recovered in the substantially anhydrous condition suitable for recycling to the sludge-forming reaction.

The mixture of conjunct polymers as recovered from the catalyst-hydrocarbon sludge in accordance with the methods hereinabove described comprises a series of high molecular weight cyclic compounds of wide boiling range but of homologous structure of which a large proportion contains conjugated olefinic double bond systems, although the exact composition of the mixture will vary somewhat depending upon the particular charging stock, the catalyst and the conditions of operation employed. The material has a wide boiling range of from about 150 to over 450° C., density of from about 0.83 to about 0.93, index of refraction of from about 1.47 to about 1.53 (but usually 1.48 to 1.50), specific dispersion of from about 125 to about 175 (usually between 135 and 145), bromine numbers above about 140 (although they vary considerably with the average molecular weight), maleic anhydride values of about 30 to about 90 (usually in the range of about 45 to 75), and acid numbers below about 3.

The conjunct polymers range in average molecular weights from about 200 to about 400, although the usual average is in the neighborhood of about 300. Certain fractions of the mixture of conjunct polymers have molecular weights of as low as about 150 to as high as about 1000. Although hydrogen to carbon atomic ratios vary somewhat depending upon the particular source of the material, for the product derived from a hydrogen fluoride catalyst sludge they range from about 1.67 to about 1.72 (for the various fractions) with the actual percentages of hydrogen varying from about 12.35 to 12.6. The individual hydrocarbons contain a conjugated system of olefinic double bonds as well as isolated conjugation, the total number of double bonds per molecule of hydrocarbon averaging from about 2.5 to about 4, of which from about 40 to about 70 percent are conjugated, depending upon the molecular weight of the hydrocarbon component. On the basis of analytical data obtained by infra-red and ultra-violet absorption spectra, as well as chemical data, the low boiling fractions of the mixture of conjunct polymer hydrocarbons consist mostly of monocyclic hydrocarbons while the higher boiling fractions of the mixture are of polycyclic, generally bicyclic, structure. In both series of hydrocarbons, the cyclic portion of the molecule is a $C_5$ ring having attached thereto at least 2 alkyl or unsaturated aliphatic substituents and probably at least 3 such groups. The data further indicate that one of the bonds comprising the conjugated system is within the $C_5$ cyclic portion of the molecule and the other double bond of the conjugated pair resides in one or more of the alkenyl or alkapolyenyl substituents. The latter groups or side chains are highly branched and may contain isolated unsaturation as well as conjugated unsaturation. The hydrocarbon components present in the mixture of conjunct polymers boil over a relatively wide boiling range of from about 150° to about 450° C. and comprise a series of homologues and isomers. Typical hydrocarbons contained in the mixture of conjunct polymers may be represented structurally by the formula:

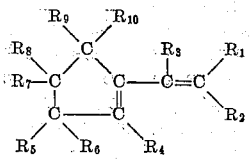

wherein $R_1$–$R_{10}$ are selected from the group consisting of hydrogen and the hydrocarbon radicals, alkyl, alkenyl and alkapolyenyl, at least two of the substituents $R_4$–$R_{10}$ are hydrocarbon radicals and not more than three of the substituents $R_1$–$R_4$ are hydrogen. In general, the aliphatic substituents attached to the cyclopentene nucleus are of relatively short chain length and one or more of the radicals may be methyl groups.

Certain fractions of the mixture of conjunct polymers may be utilized to provide surface active agents of a high degree of effectiveness, approaching an activity value corresponding to some of the most effective agents of this type known. For this purpose, fractions boiling from about 275° to about 375° C. are especially valuable, said fractions containing components having molecular weights of from about 225 to about 380, corresponding to carbon atom contents of from about 16 to about 27 carbon atoms per molecule. It is believed the latter fractions are largely monocyclic containing relatively large branched chain aliphatic radicals attached to the cyclic nucleus. To effect separation of various fractions of the mixture of conjunct polymers, it is desirable to employ subatmospheric fractional distillation at pressures preferably less than about 50 mm. mercury absolute.

To prepare the dibasic acidic adducts of this invention, the neutral salts of which comprise the desired surface active products of the present process, the above conjunct polymers, separated from a conjunct polymerization catalyst-hydrocarbon sludge are reacted or condensed with a dienophilic mono- or dibasic acidic compound. The latter class of reactants are characterized as unsaturated acids or their anhydrides containing $\alpha$-, $\beta$-olefinic unsaturation which are capable of condensing with a conjugated polyenic compound to yield an adduct thereof. Thus, acidic dienophiles contain the reactive group:

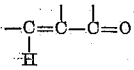

which reacts with the conjunct polymers containing conjugated unsaturation to yield unsaturated acids of high molecular weight and containing at least two rings. A typical reaction mechanism involving the present reactants is represented by the following equation in which a lower molecular weight, monocyclic conjunct polymer and a mono-basic acidic dienophile are selected as the typical reactants:

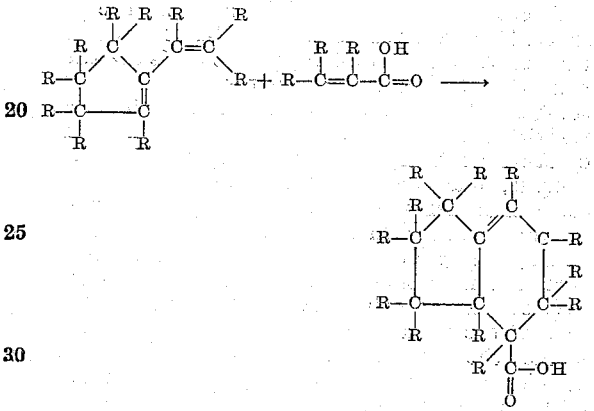

where R is a hydrogen atom, alkyl, alkenyl or polyenyl group. The bicyclic, non-aromatic acidic product represents the detergent intermediate which when neutralized yields one of the typical products of the present invention. Of the utilizable acidic dienophiles in the reaction, representative compounds of this type are maleic or fumaric acid, itaconic acid, citraconic acid, crotonic acid, and acrylic acid, their anhydrides and esters. The dibasic acids and their anhydrides, particularly maleic acid and anhydride are preferred herein because of their general availability and the highly effective surface active properties of their adducts and salts.

The reaction involved in the formation of the adducts proceeds at temperatures generally below about 120° C., preferably at temperatures of from about 60° to about 110° C. When the lower boiling fractions of the mixture of conjunct polymers are utilized as the hydrocarbon reactant, condensation may even take place spontaneously at room temperature accompanied by the evolution of heat. When higher boiling fractions of the conjunct polymers are utilized, the reactants must be heated, but in no case do the temperatures used reach those necessary to effect the reaction of aromatic or non-conjugated diolefinic or mono-olefinic compounds with a material such as maleic anhydride—a reaction which begins at about 180° C. The acid adduct comprises a mixture of compounds consisting of polycyclic, polyolefinic, dibasic acids having an average molecular weight of between about 300 and about 600 and having for the most part at least two olefinic double bonds per molecule.

The polyolefinic, polycyclic, acidic adducts herein provided, comprising the acidic predecessor of the present detergent, are prepared by commingling the mixture of conjunct polymers or selected fractions thereof with maleic anhydride or other dienophile and heating the mixture to a temperature of from about 60° to about 110° C., preferably under reflux, until the reaction is complete. In some cases completion of the reaction may be tested by determining the diene values of recovered unreacted hydrocarbons. A more convenient method, however, is the method of following the reaction by the reduction in dispersion of the reaction mixture as reaction proceeds. The proportion of maleic anhydride to hydrocarbon conjunct polymers employed may be varied, depending upon the character of the hydrocarbon mixture and the desired end product, but generally, it is preferred to have present an excess of the conjunct hydrocarbon polymers in the reaction mixture to obtain a nearly complete conversion of the dienophilic acid as possible. An excess of certain dienophiles such as maleic anhydride may also be used, and the unreacted portion recovered by sublimation from the reaction mixture. The adduct acids are then converted to the sodium salt or other water-soluble salt of the type hereinabove set forth by reacting the acidic adduct with an aqueous alkali or other neutralizing agent such as sodium hydroxide, until a clear solution is obtained. This solution is then allowed to cool and in some cases finally chilled with ice. The neutralized soap usually precipitates from the cooled aqueous mixture and may thereafter be filtered, dried and recovered as a nearly white granular solid. Other salts of the adduct acids with such bases as ammonia, the mono-, di-, and trialkyl or alkanol amines, such as for example, dibutylamine and triethanol amine etc., pyridine, and the like may be prepared for specific applications. In a typical application, for example, a wholly organic salt such as an alkylamine or alkanolamine reaction product of the adduct acids may be utilized where solubility requirements give preference to salts of this type, as, in the case of dissolving the salt in an organic solvent, such as a drying oil.

To the salts of the invention, various additives, water-softeners, or builders may be added, as for example, such material as sodium silicate, sodium borate, sodium carbonate, sodium sulfate, sodium phosphate, sodium polyphosphates, etc., particularly when the products are to be used as detergents in aqueous solutions thereof. When added to the present surface active agents to provide a detergent composition, the builder salts may comprise up to about 85% by weight thereof, preferably from 35 to about 65% by weight.

The detergents prepared according to the method hereinabove outlined are adapted to the preparation of emulsions between numerous hydrophilic and lipophilic materials. They are particularly suitable for preparing water-emulsion paints, since the unsaturated character of the acid radicals is believed to lead to their ultimate oxidation and polymerization or copolymerization with the drying oil ingredients present in the emulsion, thus, entering into the formation of a portion of the film resulting on drying the emulsion paint. In addition to being used alone as washing, wetting or emulsifying agents, the compositions of my invention may be combined with other synthetic surface active agents or with soaps derived from natural glyceride oils.

The following examples are intended to illustrate my invention, but are not to be considered as limiting the generally broad scope of the invention in strict accordance therewith.

*Example I*

22 liters (16.5 kg.) of non-selective polymer of Br. No. 162 (polymers of mixed butylenes and propylene referred to as a polymer gasoline) consisting predominantly of mono-olefinic hydrocarbons containing from 8 to 12 carbon atoms per molecule was charged into an autoclave and rapidly stirred as 9.0 kg. of liquid anhydrous hydrogen fluoride was introduced into the reactor. The pressure was maintained throughout the reaction at an average value of about 205 pounds per square inch by means of compressed nitrogen. The temperature was increased to 91° C. and stirring was continued for an additional 1 hour. The reaction mixture was allowed to stand quiescent for several minutes, the mixture separating into two phases on standing: an upper saturated hydrocarbon layer (bromine number—10) and a lower acidic layer. The upper layer, after washing with caustic solution to remove a small amount of dissolved hydrogen fluoride, weighed 8.1 kg.

The lower acidic layer weighed 16.1 kg. after removal of entrained "upper layer" by extracting the latter with liquid pentane and was a light brown mobile fluid having a density of 0.93 at 4° C. Its yield, based on the total charge, was 65.5 percent.

The above hydrogen fluoride sludge, when introduced into water, decomposes violently, liberating considerable heat, and results in the separation of an oil on the surface of the aqueous phase. In this stage of the process, 100 g. of the coordination compound as prepared above was allowed to flow into a mixture of ice and water, additional ice being added as the heat of reaction melted the ice in the hydrolyzing reactor. 43.4 g. of a light-colored, sweet-smelling oil separated from the aqueous phase, a yield of 42.4% based on the original olefin charged and 43.4% based on the weight of sludge hydrolyzed. An examination of the oil indicated the following properties.

| | |
|---|---|
| Boiling range °C | 160° to above 400 |
| Density, $d_4^{20}$ | 0.863 |
| Refractive index, $n_D^{20}$ | 1.4871 |
| Color, Gardner | 12–13 |
| Molecular weight | 263 |
| Diene number | 85 |
| Bromine number | 195 |
| Specific dispersion | 143 |
| Percent fluorine | 0.06 |
| Double bonds/molecule (average) | 3.2 |

Although the conjunct polymers herein provided were prepared from a hydrogen fluoride sludge and were recovered therefrom by an aqueous hydrolysis procedure, substantially the same material may be obtained from an aluminum chloride or sulfuric acid sludge, as hereinabove specified and the conjunct hydrocarbon polymers may be recovered from the hydrogen fluoride sludge by distilling off the hydrogen fluoride. If the sludge is subjected to excessive distillation temperatures or periods of contact with the hydrogen fluoride, however, the conjunct polymers in the sludge tend to condense into higher molecular weight compounds containing fewer conjugated olefinic bonds.

The mixture of conjunct polymers or sludge hydrocarbons as separated by the above hydrolyzing procedure was vacuum distilled into several fractions and adducts were prepared from each of the separate fractions by heating the same with the theoretical molecular equivalent of the acidic dienophile reactant, where the molecular equivalent of the hydrocarbon reactant was based upon the average molecular weight of the hydrocarbons contained in the fraction. In each reaction, the mixture of conjunct polymers and dienophile (maleic anhydride in the present example) were heated for 6 hours at 80° C. followed by neutralizing the reaction mixture with a 10% aqueous sodium hydroxide solution, refluxing the aqueous mixture until a clear solution was obtained, decanting unreacted hydrocarbons from the aqueous phase and cooling the resulting solution in ice. Upon cooling, a precipitate formed which was filtered and finally oven-dried at 110° C. Data for the preparation of the adducts and surface active salts thereof for each of the indicated fractions of conjunct polymers is given in the following table:

| | | | | |
|---|---|---|---|---|
| Maleic anhydride adduct, parts by weight | 27.68 | 28.51 | 26.83 | 33.25 |
| Source of adduct (conjunct polymer fraction boiling range, °C.) | 200–275 | 275–320 | 320–370 | 370 |
| Molecular weight | 205 | 257 | 321 | 448 |
| Sodium hydroxide, parts by weight | 7.86 | 6.62 | 5.40 | 4.85 |
| Water, parts by weight | 196 | 164 | 136 | 170 |
| Weight of soap, parts by weight | 19.65 | 27.37 | 25.24 | 34.13 |
| Percent sodium in soap | 10.3 | 8.8 | 6.9 | 5.8 |
| Atoms of sodium per mol of soap | 1.58 | 1.55 | 1.40 | 1.50 |
| Atoms of carbon per mol of soap | 19 | 23 | 27 | 37 |

The wetting power of the sodium soaps of the maleic anhydride adduct of certain fractions of the conjunct polymers as determined by the Draves Wetting Test are shown in the following table:

| Boiling Range, °C., of Conjunct Polymers | Molecular Weight | Wetting power (Grams per liter required for 25 seconds Draves Test |
|---|---|---|
| 200–275 | 205 | 1.06 |
| 275–320 | 257 | 0.38 |
| 320–370 | 321 | 0.88 |
| >370 | 448 | 8.0 |

The data show that the maximum wetting power is obtained with soaps derived from those fractions of the conjunct polymers having a boiling range of from about 275° C. to about 325° C. and a molecular weight within the range of from about 225 to about 300, corresponding to a range of from about 16 to about 22 carbon atoms per molecule or an average of about 19 carbon atoms.

Comparative wetting power of the sodium salt of an adduct of maleic anhydride and the mixture of conjunct polymers prepared as above but not separated into selected fractions is shown in the following table:

| Compounds | Grams per liter required for 25 seconds Draves sinking time at 30° C. |
|---|---|
| Sodium salt of maleic anhydride adduct | 1.0 |
| Triamylbenzene sodium sulfonate | 0.78 |
| Sodium oleate | 0.86 |
| Tertiary amylbenzine sodium sulfonate | 1.03 |

The detersive effect of the composition of my invention was tested as follows: 10 rubber balls (⅜" diameter, each weighing about 1.1 grams) and three 2" x 2" swatches of standard soiled cloth (soiled with a graphite, mineral oil and vegetable oil mixture) were placed in 200 ml. of the detergent solution containing various concentrations of electrolyte (sodium sulfate) in pint jars. These were sealed and fastened to the rotor of a standard launderometer and rotated at 42 R. P. M. for 10 minutes at 140° F. (60° C.). The swatches were then rinsed thoroughly in distilled water, squeezed by hand and laid out on towels to dry. When dry, the swatches were read on a photovolt reflectometer. It was found that with various concentrations of sodium sulfate at 0.05% concentration of detergent, the cloth gave a reflectancy of 42 with the optimum amount of sodium sulfate. When washed in plain water, the soiled cloth gave a reflectancy of about 28. The optimum washing power is obtained with soaps derived from a conjunct polymer fraction having an average boiling point of from about 320° C. to about 375° C. and a molecular weight of about 260 to about 380, corresponding to a range of about 19 to about 27 carbon atoms per molecule or an average of about 22 carbon atoms.

*Example II*

To prepare the soap of a monobasic adduct of the conjunct polymers, the latter hydrocarbons were heated with an equivalent amount of methylacrylate at a temperature of 110° C. The esters were saponified and the water insoluble material recovered after conversion to the acid form. The acid material was then separated from the inert hydrocarbon, by extraction of the latter with petroleum ether from a water solution of the sodium salts formed by neutralization of the acids. The soap of the monobasic adduct was found to foam better than did that of the soap of the maleic anhydride adduct and to have surface-active powers.

I claim as my invention:

1. A surface active agent comprising a water soluble salt of an adduct of, (1) an acidic dienophile selected from the group consisting of the mono and dibasic acidic compounds containing the reactive group:

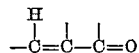

and (2) a polyolefinic, cyclic hydrocarbon fraction boiling in the range of from about 150° to about 450° C., and having an average molecular weight of from about 200 to about 400, an average number of olefinic bonds per molecule of from about 2.5 to about 4 of which from about 40% to about 70% are conjugated, a density of from about 0.83 to about 0.93, an index of refraction of from about 1.47 to about 1.53, a specific dispersion of from about 125 to about 175, a bromine number above 140, a maleic anhydride value of from about 30 to about 90 and an acid number below about 3.

2. A surface active agent comprising a water soluble salt of an adduct of, (1) maleic anhydride and (2) a polyolefinic, cyclic hydrocarbon fraction boiling in the range of from about 150° to about 450° C., and having an average molecular weight of from about 200 to about 400, an average number of olefinic bonds per molecule of from about 2.5 to about 4 of which from about 40% to about 70% are conjugated, a density of from about 0.83 to about 0.93, an index of refraction of from about 1.47 to about 1.53, a specific dispersion of from about 125 to about 175, a bromine number above 140, a maleic anhydride value of from about 30 to about 90 and an acid number below about 3.

3. A surface active agent comprising a water soluble salt of an adduct of, (1) a monobasic acidic dienophile selected from the group consisting of the mono and dibasic acidic compounds containing the reactive group:

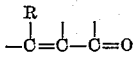

and (2) a polyolefinic, cyclic hydrocarbon fraction boiling in the range of from about 275° to about 375° C., and having an average molecular weight of from about 225 to about 380, an average number of olefinic bonds per molecule of from about 2.5 to about 4 by which from about 40% to about 70% are conjugated, a density of from about 0.83 to about 0.93, an index of refraction of from about 1.48 to about 1.50, a specific dispersion of from about 135 to about 145, a bromine number above 140, a maleic anhydride value of from about 45 to about 75 and an acid number below about 3.

4. A surface active agent comprising the sodium salt derived from an adduct of methylacrylate and a polyolefinic cyclic hydrocarbon fraction boiling within the range of from about 150° to about 450° C., having an average molecular weight of from about 200 to about 400, an average number of olefinic bonds per molecule of from about 2.5 to about 4 of which from about 40% to about 70% are conjugated, said fraction being obtained by effecting conjunct polymerization of an olefinic hydrocarbon containing at least 3 carbon atoms per molecule in the presence of substantially anhydrous hydrogen fluoride, separating the reaction mixture into a hydrocarbon phase and a catalyst sludge phase and recovering from said sludge phase said mixture of polyolefinic, cyclic hydrocarbons possessing the aforementioned properties.

HERMAN S. BLOCH.

REFERENCES CITED

The following references are of record in the file of this patent:

UNITED STATES PATENTS

| Number | Name | Date |
|---|---|---|
| 1,944,731 | Diels et al. | Jan. 23, 1934 |
| 2,104,956 | Stern et al. | Jan. 11, 1938 |
| 2,230,005 | Moser | Jan. 28, 1941 |
| 2,352,606 | Alder et al. | July 4, 1944 |

OTHER REFERENCES

Kohler et al.: Journ. Am. Chem. Soc., vol. 61, pp. 1057–1061 (1929).